United States Patent
Shanmugasundaram et al.

(10) Patent No.: US 6,922,770 B2
(45) Date of Patent: Jul. 26, 2005

(54) MEMORY CONTROLLER PROVIDING DYNAMIC ARBITRATION OF MEMORY COMMANDS

(75) Inventors: Venkatachalam Shanmugasundaram, Santa Clara, CA (US); Edward Paluch, Santa Clara, CA (US); Shirish Gadre, San Jose, CA (US); Jean Kao, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1 day.

(21) Appl. No.: 10/446,333

(22) Filed: May 27, 2003

(65) Prior Publication Data

US 2004/0243785 A1 Dec. 2, 2004

(51) Int. Cl.[7] .............................................. G06F 12/10
(52) U.S. Cl. ........................ 711/209; 711/5; 711/156; 711/167
(58) Field of Search .......................... 711/5, 105, 150, 711/156–157, 167–169, 202, 209; 710/5, 7, 17–21, 39, 52–53, 240, 305; 365/189.05, 230.03–230.04, 238.5

(56) References Cited

U.S. PATENT DOCUMENTS

| | | | | |
|---|---|---|---|---|
| 5,748,551 A | * | 5/1998 | Ryan et al. ............ | 365/230.03 |
| 5,778,419 A | * | 7/1998 | Hansen et al. ............... | 711/112 |
| 6,205,511 B1 | * | 3/2001 | Wen ................................ | 711/5 |
| 6,564,284 B2 | * | 5/2003 | Christenson ................... | 711/5 |
| 6,615,326 B1 | * | 9/2003 | Lin ............................ | 711/154 |
| 6,622,225 B1 | * | 9/2003 | Kessler et al. ............... | 711/158 |
| 2002/0169921 A1 | * | 11/2002 | Saitoh ........................... | 711/5 |
| 2003/0120855 A1 | * | 6/2003 | Hatakeyama et al. .......... | 711/5 |

* cited by examiner

Primary Examiner—Denise Tran
(74) Attorney, Agent, or Firm—Wagner, Murabito & Hao LLP

(57) ABSTRACT

Embodiments of the present invention provide a memory controller comprising a front-end module, a back-end module communicatively coupled to the front-end module, and a physical interface module communicatively coupled to the back-end module. The front-end module generates a plurality of page packets from a plurality of received memory commands, wherein the order of receipt of said memory commands is preserved. The back-end module dynamically issues a next one of the plurality of page packets while issuing a current one of the plurality of page packets. The physical interface module causes a plurality of transfers according to the dynamically issued current one and next one of the plurality of page packets.

24 Claims, 9 Drawing Sheets

| CLOCK | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| COMMAND | RAS B0 | | | CAS B0 | | CAS B0 | | CAS B0 | | CAS B0 | | | PRE B0 | | | RAS B1 | | | CAS B1 | |
| DATA | | | | | D1 B0 | D2 B0 | D3 B0 | D4 B0 | D5 B0 | D6 B0 | D7 B0 | D8 B0 | | | | | | | | D1 B1 |

| CLOCK | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| COMMAND | | PRE B1 | | | RAS B2 | | | CAS B2 | | | PRE B2 | | | RAS B3 | | | CAS B3 | | | PRE B3 |
| DATA | D2 B1 | | | | | | | | D1 B2 | D2 B2 | | | | | | | | D1 B3 | D2 B3 | |

**FIGURE 2
(CONVENTIONAL ART)**

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| QUEUE 1 | RAS B0 | CAS B0 | CAS B0 | CAS B0 | RAS B2 | CAS B2 | | | | | | | | | | | | | |
| QUEUE 2 | RAS B1 | CAS B1 | RAS B3 | CAS B3 | | | | | | | | | | | | | | | |
| CLOCK | 0 | 1 | 2 | 3 | 4 | 5 | 6 | 7 | 8 | 9 | 10 | 11 | 12 | 13 | 14 | 15 | 16 | 17 | 18 | 19 |
| CURRENT | RAS B0 | | | CAS B0 | | CAS B0 | | CAS B0 | | CAS B0 | | CAS B1 | | CAS B2 | CAS RAS B3 B3 | | | CAS B3 | | |
| NEXT | | | | | | RAS B1 | | | | RAS B2 | | | | | | | | | | |
| COMMAND | RAS B0 | | | CAS B0 | CAS B0 | CAS RAS B0 B1 | CAS B0 | CAS PRE B0 B3 | PRE CAS B3 B0 | RAS CAS B2 B0 | RAS CAS B2 B1 | RAS CAS B2 B1 | | CAS B2 B1 | RAS PRE B3 B0 | | | CAS B3 | | |
| DATA | | | | D1 B0 | D2 B0 | D3 B0 | D4 B0 | D5 B0 | D6 B0 | D7 B0 | D8 B0 | D1 B1 | D1 B1 | D2 B1 | D1 B2 | D2 B2 | | | D1 B3 | D2 B3 |

FIGURE 7

ROW ACTIVATE BANK OVERLAP

PRECHARGE BANK OVERLAP

| | | | | | | | | | | | | | | | | | | | | |
|---|---|---|---|---|---|---|---|---|---|---|---|---|---|---|---|---|---|---|---|---|
| QUEUE 1 | RAS B0 | CAS B0 | RAS B0 | CAS B0 | | | | | | | | | | | | | | | | |
| QUEUE 2 | RAS B1 | CAS B1 | | | | | | | | | | | | | | | | | | |
| | | | | | | | | | | | | | | | | | | | | |
| CLOCK | 0 | 1 | 2 | 3 | 4 | 5 | 6 | 7 | 8 | 9 | 10 | 11 | 12 | 13 | 14 | 15 | 16 | 17 | 18 | 19 |
| CURRENT | RAS B0 | | | | CAS B0 | | CAS B1 | | | | | RAS B0 | | CAS B0 | | | | | | |
| NEXT | | | | RAS B1 | | | | | | | | | | | | | | | | |
| COMMAND | RAS B0 | | PRS B3 | RAS B1 | CAS B0 | W2 B0 | CAS B1 | W1 W2 B1 B1 | PRE PRE B0 B2 | | | RAS B0 | | CAS B0 | W1 B0 | W2 B0 | | | | |
| DATA | | | | | W1 B0 | W2 B0 | W1 B1 | W2 B1 | | | | | | | | | | | | |

PRECHARGE BANK OVERLAP

FIGURE 8

MEMORY CONTROLLER PROVIDING DYNAMIC ARBITRATION OF MEMORY COMMANDS

FIELD OF THE INVENTION

Embodiments of the present invention relate to memory controllers, and more particularly to dynamically allocating memory commands to increase memory bandwidth.

BACKGROUND OF THE INVENTION

Referring to FIG. 1, a system on a chip (SOC) 105 according to the conventional art is shown. The SOC is typically an application specific integrated circuit (ASIC). As depicted in FIG. 1, a memory controller 110 is an integral part of most SOCs 105. The memory controller 110 provides for transfer of data between an external memory unit 115 and the SOC 105.

The memory unit 115 is coupled to the memory controller 110 by an address bus 120, a data bus 125, and a plurality of control lines 130. Typically, the memory unit 115 comprises an array of memory cells arranged in a plurality of banks 135–138. A bank decoder 145 provides for decoding a first portion of lines of the address bus, to select one of the plurality of banks 135–138. A row decoder 150 provides for decoding a second portion of lines of the address bus, to select one of a plurality of rows within the selected bank 135–138. A column decoder 155 provides for decoding a third portion of lines of the address bus to select one of a plurality of columns within the selected bank 135–138.

Depending upon the SOC 105, application bandwidth requirements and operating conditions, a variety of external memory units 115 are deployed. For example, the memory unit 115 may be a single data rate (SDR) or double data rate (DDR) type SDRAM. The memory unit may comprise 2, 4, 8, 16, or more banks. The data bus 125 of the memory unit 115 may comprise 16, 32, 64, 128 or more signal lines. The memory unit 115 may support burst data transfer, wherein the burst length may be 2, 4, 8, 16 or more words or the like. The memory unit may also be any one of several speed grades.

The memory controller 110 implements a protocol for transferring data to and from the memory unit in accordance with the requirements of the type of memory unit 115 and/or requirements of the vendor of the memory unit 115. For example, in order to transfer data to or from an SDRAM, before any read or write commands can be issued to a bank 135–138, a row in that bank 135–138 has to be opened. This is accomplished with one or more activate (ACT) commands which selects the bank 135–138 and the row to be activated. After the row is opened with an ACT command, a read or write command may be issued to the column, subject to timing specific ACT to CAS timing constraints. Once a bank 135–138 is opened with an ACT command, it must be closed with a precharge (PRE) command, before a different row in the same bank can be opened (e.g., activated).

There are several timing constraints that have to be satisfied for access to the memory unit 115. Table 1 shows exemplary timing constraints for a synchronous dynamic random access memory (SDRAM).

TABLE 1

| Constraint | Symbol | Min | Max | Unit | @ 133 MHz (tCK = 7.5 ns) |
|---|---|---|---|---|---|
| Activate (RAS) to Precharge (PRE) | TRAS | 45 | 120000 | ns | 6 Clock |
| Activate (RAS) to Active/Auto Refresh | TRC | 65 | | ns | 9 Clock |
| Activate (RAS) to Read/Write (CAS) | TRCD | 20 | | ns | 3 Clock |
| Precharge (PRE) to Activate (RAS) | TRP | 20 | | ns | 3 Clock |
| Activate (RAS) Bank A to Active (RAS) Bank B | TRRD | 15 | | ns | 2 Clock |
| Write Recovery Time | TWR | 15 | | ns | 2 Clock |
| Internal Write to Read Command Delay | TWTR | 1 | | $t_{CK}$ | 1 Clock |

Some of the timing constraints are dependent on the clock speed of the SDRAM and others based on the SDRAM vendor's specifications.

Referring now to FIG. 2, an exemplary sequence of transfers according to the convention art is shown. The exemplary series of transfers is based upon a synchronous dynamic random access memory (SDRAM) operating in double data rate (DDR) mode, having four banks and supporting a burst size of 4. As illustrated in FIG. 2, the first transfer comprises writing 8 words to Bank 0 (B0) the second, third and fourth transfers each comprises a write of 2 words to Banks 1, 2 and 3 (B1, B2, B3) respectively.

The row of the bank to which the data is to be written is opened (e.g., activated) upon initiation of a transfer. The data is then transferred by activating the applicable row of the bank. The bank is then closed upon completion of the transfer to the bank. The various commands are issued according to timing constraints of the applicable protocol of the memory unit.

For example, a row access command ($RAS_{B0}$) and four column access commands ($CAS_{B0}$) are issued to transfer the eight words ($W1_{B0}$–$W8_{B0}$) to Bank 0, between clock cycles 0–11. Bank 0 is then closed by a precharge command $PRE_{B0}$. One row access command ($RAS_{B1}$) and one columns access command ($CAS_{B1}$) are issued to transfer the second page packet to Bank 1, between clock cycles 15–20. Bank 1 is then closed by a precharge command ($PRE_{B1}$). One row access command ($RAS_{B2}$) and one column access command ($CAS_{B2}$) are issued to transfer the third page packet to Bank 2, between clock cycles 24–29. Bank 2 is then closed by a precharge command ($PRE_{B2}$). One row access command ($RAS_{B3}$) and one column access command ($CAS_{B3}$) are issued to transfer the fourth page packet to Bank 3, between clock cycles 33–38. Bank 3 is then closed by a precharge command ($PRE_{B3}$).

The exemplary series of write transfers consumes 40 clock cycles. A substantial number of the clock cycles are not utilized to issue access commands and/or write the data. Therefore, the bandwidth of the SDRAM is not utilized efficiently.

Furthermore, depending upon the SOC platform and applications, the memory interface controller may have to support various data access patterns. For example, the memory interface controller may need to support simple linear access for video scan line fetch or a complex 2D access for MPEG applications. For each such data access pattern, the memory interface controller has to map the logical address to the physical address (bank, row, column, chip-select) such that the external SDRAMs can understand. Thus, the memory interface controller has to support a variety of logical to physical address mappings based on internal bus commands and external memory configurations.

The memory controller should also be parameterizable for different configurations. For example, low-end cost conscious applications such as consumer DVDs, where a low pin count is important, lower interface widths are common. For high-end graphics applications that require high memory bandwidth, high interface widths are common.

SUMMARY OF THE INVENTION

Embodiments of the present invention provide an improved memory controller. The memory controller provides for increased bandwidth utilization. The memory controller is also parameterizable. The memory controller interfaces with various SOCs, various memory units, and service a variety of data access patterns. The memory controller is also adaptable to a wide range of applications. The memory controller is also independent of the interface width and external configuration of the memory unit. The memory controller also provides the protocol and related timing constraints set by the particular memory unit vendor. The memory controller also supports various interface widths (e.g., 16, 32, 64, 128 bits wide, or the like) regardless of the external memory types (e.g., SDR, DDR, or the like). The memory controller also supports a multitude of banks (2, 4, 8 or the like).

Embodiments of the present invention increase memory bandwidth by dynamically finding bank overlap opportunities of memory commands. Embodiments of the present invention utilize multi-bank features of memory devices and searches for any bank-overlapping opportunities by looking ahead into a next memory access. Embodiments of the present invention fill idle clock cycles during the current bank access, either by activating a bank used for future access or by precharging an open bank from previous access. Furthermore, the additional idle clock cycles during burst access may also be exploited to increase the bandwidth of the memory unit.

Embodiments of the present invention provide a memory controller comprising a front-end module, a back-end module communicatively coupled to the front-end module, and a physical interface module communicatively coupled to the back-end module. The front-end module generates a plurality of page packets from a plurality of received memory commands, wherein the order of receipt of said memory commands is preserved. The back-end module dynamically issues a next one of the plurality of page packets while issuing a current one of the plurality of page packets. The physical interface module causes a plurality of transfers according to the dynamically issued current one and next one of the plurality of page packets.

Embodiment of the present invention provide a method of accessing an external memory unit comprising receiving a plurality of bus packets. A plurality of page packets are then generated from the plurality of bus packets, wherein each of the plurality of page packets corresponds to one of the plurality of bus packets. The logical address of each of the plurality of bus packets is translated into a physical address for inclusion in each corresponding one of the plurality of page packets. The plurality of page packets are then loaded round-robin into a dual page packet queue, wherein the original order of receipt of the bus packets is preserved. A next page packet is then dynamically issued while a current page packet is being issued, if protocol, timing constraints and bank overlap requirements are met.

Embodiments of the present invention advantageously provide for efficient bandwidth utilization. Embodiments of the present invention may realize an increase in memory bandwidth of approximately 20%. Embodiments of the present invention also provide efficient bandwidth utilization for various of types of memory, for various bank configurations, for both burst and non-burst transfers, for various memory mappings, for various data rates, and for various data access patterns. Embodiments of the present invention may be utilized in combination with other techniques for improving performance and efficiency of memory devices, such as access reordering and bank biased arbitration.

BRIEF DESCRIPTION OF THE DRAWINGS

The present invention is illustrated by way of example and not by way of limitation, in the figures of the accompanying drawings and in which like reference numerals refer to similar elements and in which:

FIG. 2 shows an exemplary sequence of transfers according to the convention art.

FIG. 7 shows an exemplary sequence of write transfers, in accordance with one embodiment of the present invention.

FIG. 8 shows another exemplary sequence of write transfers, in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
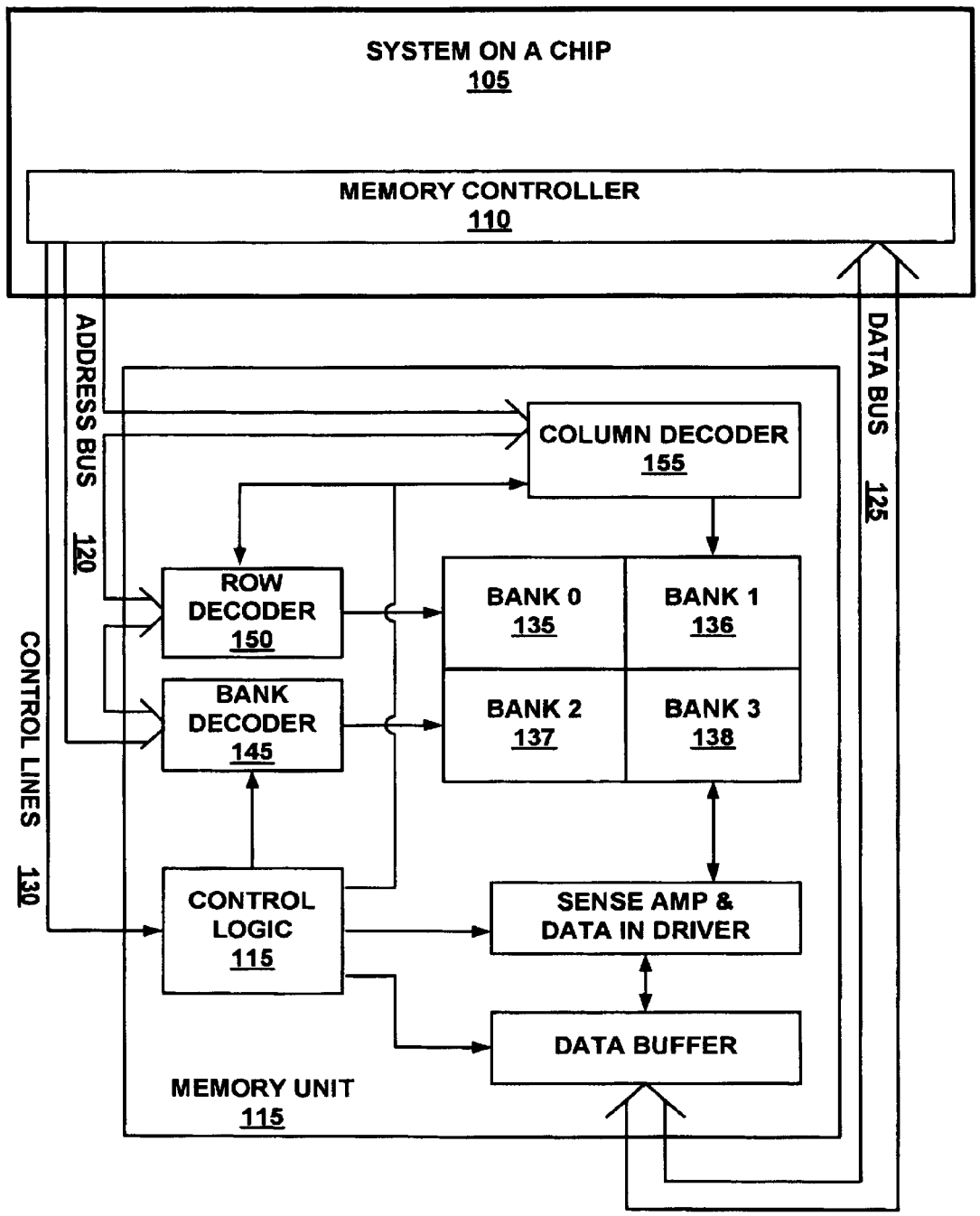
FIG. 1 shows a system on a chip (SOC) according to the conventional art.
Figure 3:
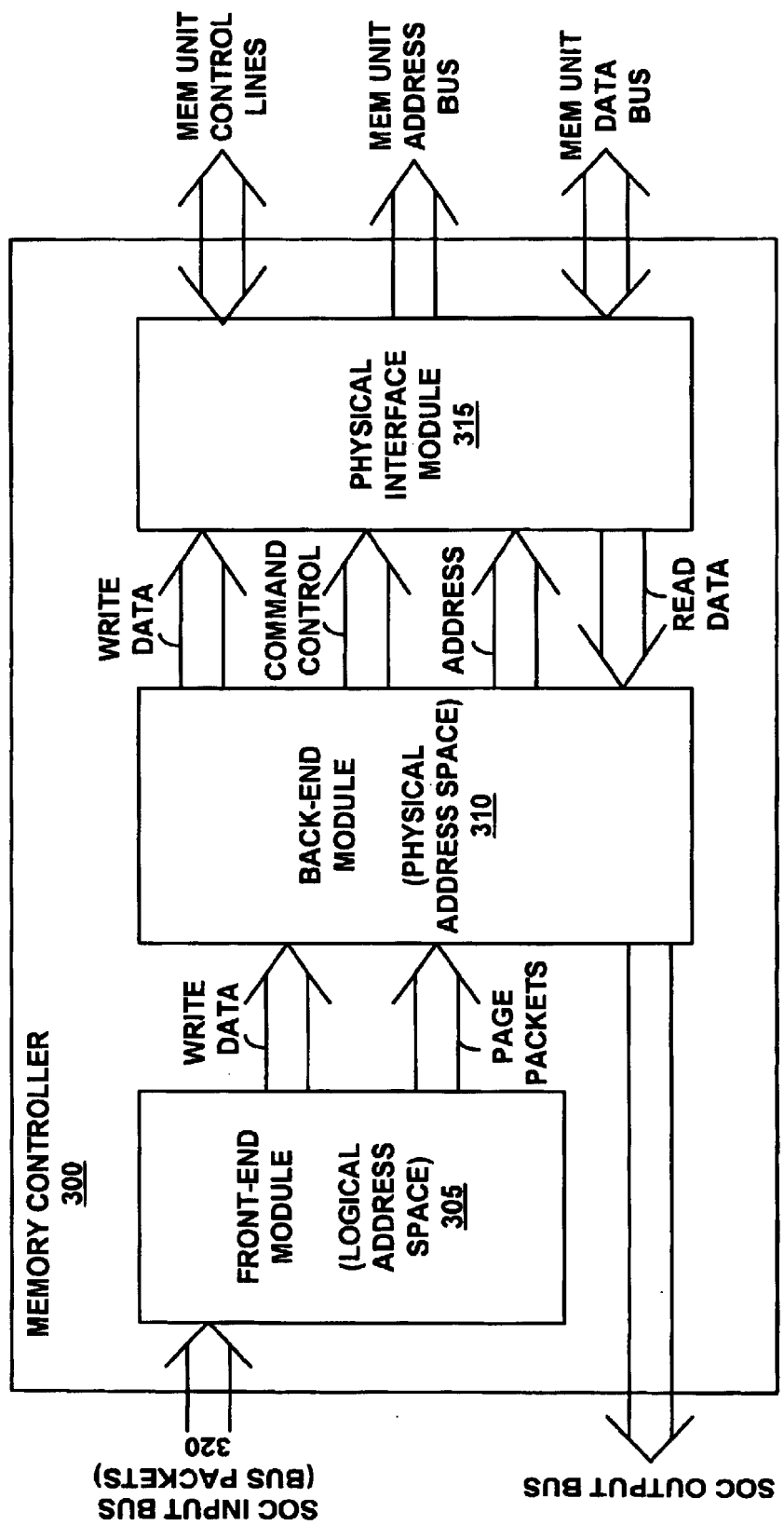
FIG. 3 shows a block diagram of a memory controller, in accordance with one embodiment of the present invention.

Referring now to FIG. 3, a block diagram of a memory controller 300, in accordance with one embodiment of the present invention, is shown. As depicted in FIG. 3, the memory controller 300 comprises a front-end module 305, a back-end module 310 communicatively coupled to the front-end module 305, and a physical interface module 315 communicatively coupled to the back-end module 310.

The front-end module 305 receives one or more memory commands on an input bus 320 from a system on a chip (SOC). The front-end module 305 generates a sequence of page packets from the received memory commands. Each page packet comprises a set of one or more access commands (e.g., ACT, PRE, or the like) in accordance with a protocol appropriate for an attached external memory unit. The front-end module also translates the logical address of the memory commands to physical address (e.g., row, column, bank, chip select, and/or the like) for the respective page packets. Each page packet is generated such that the transfer performed by the page packet is to a single page (e.g., a row in a bank) in the external memory unit. Furthermore each page packet is generated such that the set of one or more access commands begins with an activate command (e.g., row access command (RAS)), and ends with a CAS command.

In one implementation, the memory access commands received on the input bus 320 may be in the form of bus packets. The front-end module 305 translates each bus packet, referencing a logical address space, into one or more page packets, referencing a physical address space. When a transfer of a bus packet crosses over a page boundary (e.g., contained in two different rows), the bus packet is broken into multiple page packets. If the bus packet does not cross over a page boundary, the page packet directly corresponds to the bus packet from which it is generated.

The back-end module 310 decodes the page packets and issues the set of access commands (e.g., RAS, CAS, or the like) contained therein, while providing for memory unit specific protocol timing requirements. The back-end module exploits bank-overlapping opportunities, between the current page packet and the next page packet, to increase memory unit utilization. By dynamically issuing access commands of the next page packet during execution of access commands of the current page packet, data can be written and read seamlessly into the external memory unit.

Accordingly, the back-end module 310 arbitrates between a first transfer to a first bank, and a second transfer to a second bank. Arbitration is provided for by monitoring the status of the banks of the memory unit to determine what action can be performed in a given bank. Therefore, the back-end module may issue an access command in the next page packet when there is an idle clock cycle during issuance of access commands of the present page packet, if the applicable timing constraints are satisfied. In addition, burst operation increases the number of idle clock cycles during execution of a page packet. The increase in idle slots during burst operation may thus be exploited to further increase the memory bandwidth. Furthermore, if there is an idle clock cycles and neither an access command from the current or next page packet can be performed, the back-end module may provide for precharging of banks other than the banks associated with the current and next page packets.

The physical interface module 315 is provided for interfacing with the external memory unit. The physical interface drives the appropriate control lines thereby realizing one or more portions of the sequence of access commands. For example the physical interface drives one or more control lines to enable a particular memory unit, output read or write transfer, and the like. The physical interface also drives the appropriate address lines thereby realizing one or more portions of the sequence of access commands. For example, the physical interface drives the address lines to select a particular bank, activate a particular row, activate a particular column, and the like. The physical interface also transmits and receives data by driving and sensing the data bus.

The architecture of the memory controller readily supports various timing constraints and configurations, while increasing memory bandwidth efficiency. The front-end module 305, bank-end module 310 and physical interface module 315 are readily parameterizable. For example, the front-end module 305 may readily support various SOC bus systems. The front-end module 305 may also provide for configuring the memory controller to operate with a specified number of external memory units, a specified width of row bits, a specified width of column bits, a specified number of bank bits, timing constraints of the memory unit, and/or the like. In addition the front-end module 305 may provide for indirect addressing, memory write protection, and the like. The front-end module 305 may also enable the memory controller 300 and memory unit to operate at a different clock rate from the SOC bus clock rate.

The back-end module 310 may handle other memory initialization command sequences via mode registers for the memory unit. The back-end module 310 may provide for issuing refresh commands to the memory unit. The back-end module 310 may further comprises a counter for burst length, counters for global timing constraints for ACT to ACT, counters for refresh, power up control logic, data path control logic for controlling incoming data from the memory unit, and precharge control logic.

Figure 4:
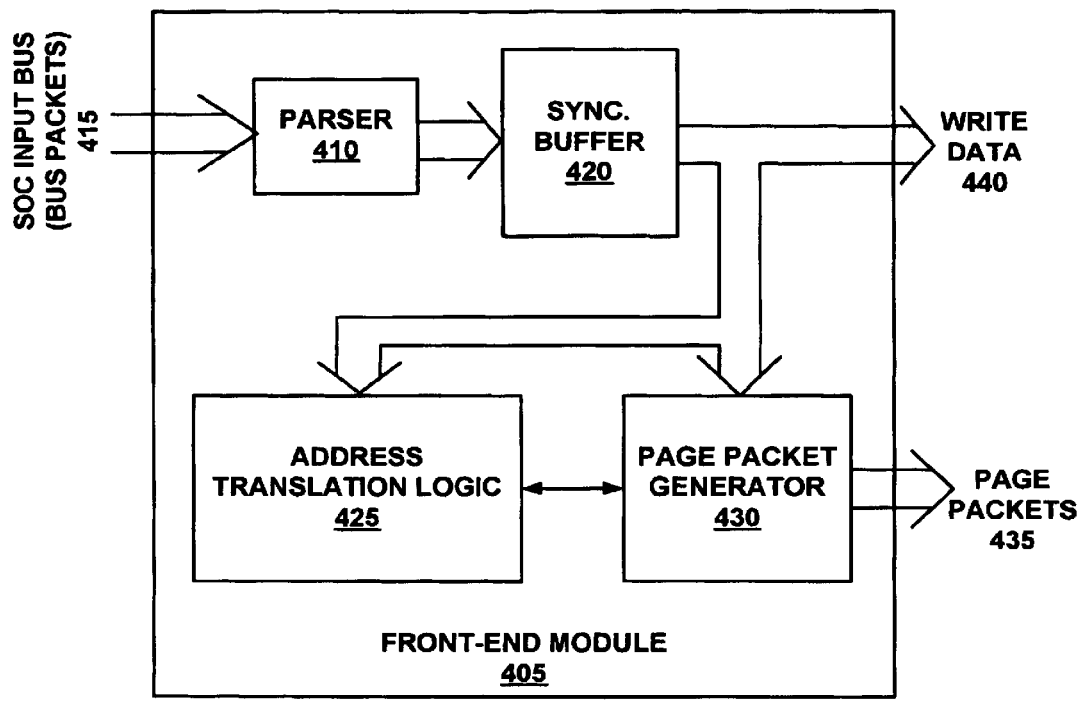
FIG. 4 shows a block diagram of a front-end module of a memory controller, in accordance with one embodiment of the present invention.

Referring now to FIG. 4, a block diagram of a front-end module 405 of a memory controller, in accordance with one embodiment of the present invention, is shown. As depicted in FIG. 4, the front-end module 405 comprises a parser 410 communicatively coupled to an input bus 415. A synchronizing buffer 420 is communicatively coupled to the parser 410. An address translation logic 425 and a page packet generator 430 are communicatively coupled to the synchronizing buffer 420.

The parser 410 acquires bus packets from the SOC input bus 415. In one implementation, the bus packet may comprise a memory command, a logical address, and data, if the transfer is a write to an external memory unit. The bus packet may comprises a memory command and a logical address, if the transfer is read from the external memory unit.

The bus packets are loaded into the synchronizing buffer 420 by the parser 410. The synchronizing buffer 420 enables the memory controller and external memory unit to operate at a different clock rate from the SOC input bus 415. The synchronizing buffer 420 outputs the memory command and logical address to the address translation logic 425 and the page packet generator 430. If the bus packet comprises a write transfer, the synchronizing buffer also outputs the write data 440 to a back-end module of the memory controller along with the corresponding byte enable (DQM) signal.

For each memory command, the address translation logic 425 converts the logical address to a physical address (e.g., row, column, bank, chip select, and/or the like). The page packet generator converts each bus packet into one or more page packets. Each page packet comprises a set of one or more access commands and the associate logical address corresponding to the bus packet. When a memory command in a bus packet crosses over a page boundary (e.g., contained in two different blocks), the bus packet is broken into multiple page packets. Breaking of the bus packet into multiple page packets ensures that access within a page packet belongs to the same block of the external memory unit. Breaking of the bus packet into multiple page packets also ensures that all page packets are started with an activate (ACT) command (e.g., row access command (RAS)) command. If the bus packet does not cross over a page boundary, the page packet directly corresponds to the bus packet from which it is generated. The page packet generator then outputs the page packet to the back-end module 435.

The front-end module may also comprise configuration registers for specifying the number of external memory units connected, width of row bits, width of column bits, timing constraints of the memory unit (e.g., ACT to CAS, ACT to PRE, and the like). Enabling or disabling such configuration parameters may be programmed through the SOC input bus 415.

Figure 5:
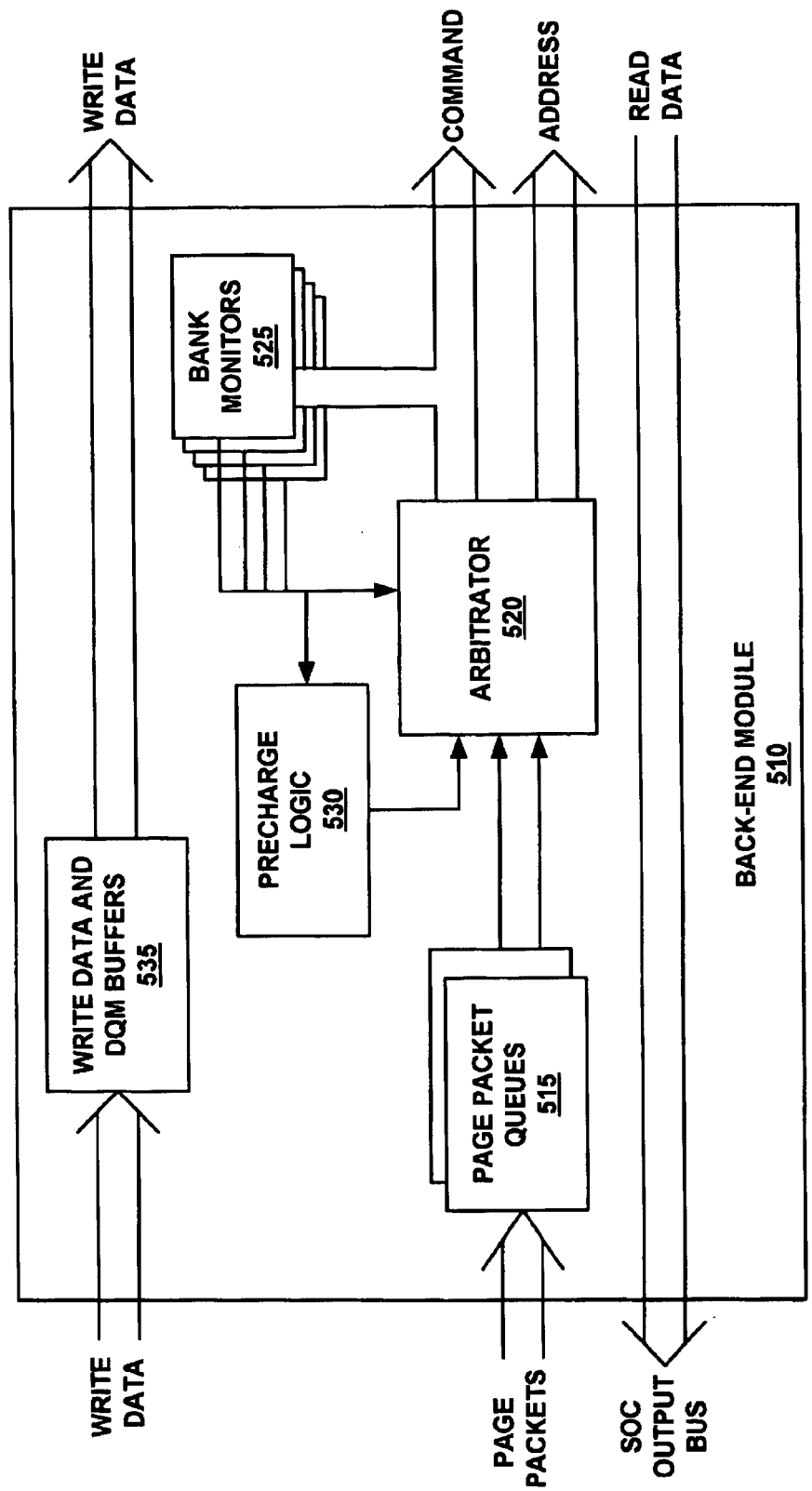
FIG. 5 shows a block diagram of a back-end module of a memory controller, in accordance with one embodiment of the present invention.

Referring now to FIG. 5, a block diagram of a back-end module 510 of a memory controller, in accordance with one embodiment of the present invention, is shown. As depicted in FIG. 5, the back-end module 510 comprises a plurality of page packet queues 515, an arbitrator 520, and a plurality of bank monitors 525. The plurality of page packet queues 515 are communicatively coupled to the arbitrator 520. The arbitrator 520 is communicatively coupled to the plurality of bank monitors 525. The back-end module 510 may also comprise a precharge logic 530 communicatively coupled to the arbitrator 520 and the plurality of bank monitors 525.

Page packets received from a front-end module are loaded round robin into the plurality of page packet queues 515. In one implementation, the plurality of page packet queues 515 comprises a pair of queues, Queue 1 and Queue 2. The received page packets are alternately loaded into Queue 1 and Queue 2. Alternately loading page packets into the page packet queues 515 enables two consecutive commands to be visible to the arbitrator 520. Thus, the page packet queues 515 enable the arbitrator 520 to look ahead for bank overlapping opportunity.

The plurality of bank monitors 515 indicate when a row in a particular bank is opened (e.g., activated) or closed (e.g., precharged). In one implementation, there are as many bank monitors 515 as the number of banks supported in an external memory unit. Based on the protocol timing requirements, the bank monitors 515 indicate what action can be performed in a given bank. The bank monitors 515 also include counters for satisfying timing constraints (e.g., RAS to CAS timing, RAS to PRE timing, PRE to RAS timing, and the like). The respective counters get triggered whenever an ACT or PRE command is performed. Therefore, the state of each bank in a memory unit is maintained, and the memory protocol is followed.

The arbitrator 520 looks at the next page packet queue (e.g., Queue 2) when there is an idle cycle during issuance of access commands of the current page packet queue (e.g., Queue 1). The arbitrator 520 issues an access command of the next page packet during an idle clock cycle of the present page packet, if the applicable timing constraints are satisfied. For example, if there is an idle clock cycle as a result of protocol timing requirement for the access command of the current page packet, and the access command of the next page packet is available and is not a CAS command, the access command of the next page packet may be issued.

When there is still an idle clock cycle and if the access commands of neither the current page packet nor the next page packet can be performed, the precharging logic 530 may precharge (e.g., close) a bank other than the banks associate with the current and next page packets.

The arbitrator 520 executes the page packets based on the following priority. First, when a read CAS is issued for an incomplete burst, the burst transfer is stopped in order to eliminate extra activity on the memory data bus. A read burst stop is accomplished by issuing a burst stop (BST) command. The arbitration logic gives priority to a BST command over other commands. Second, if the current page packet queue contains a row access command (RAS) and if the corresponding bank is not precharged, a precharge (PRE) command is issued for that bank.

Next, if the current access command is an row access command (RAS) to a particular bank and if both PRE to RAS and RAS to RAS timing constraints for issuing the RAS are satisfied, then the RAS command for the particular bank is issued. If the timing constraints are not satisfied, then an idle clock cycle (e.g., no operation (NOP)) is created, during which the arbitration logic looks at the access command in the next page packet queue to process.

If the next access command is an RAS command and if the bank is not precharged then the PRE command for that bank is issued. During an idle clock cycle of the current page packet, if the access command in the next page packet is an RAS command, and both PRE to RAS, and RAS to RAS timing constraints are satisfied, then the RAS command for next page packet is issued.

Finally, in a situation where the access command for both the current page packet and the next page packet can not be executed, the arbitration logic may then process other commands. For example, it may issue a PRE command for banks, which do not correspond to the banks activated by the current or next page packet. The precharge control logic decides to precharge based on the precharge readiness from the bank monitor of that bank.

The back-end module 510 also comprises a set of buffers for buffering the write data and associated byte enable signals (DQM) when the transfer is a write operation. The set of buffers 535 provide the data associated with a particular access command along with the necessary DQM signal. When data is being read, the back-end module 510 passes the data received from interface module to the data bus of the SOC.

Figure 6:
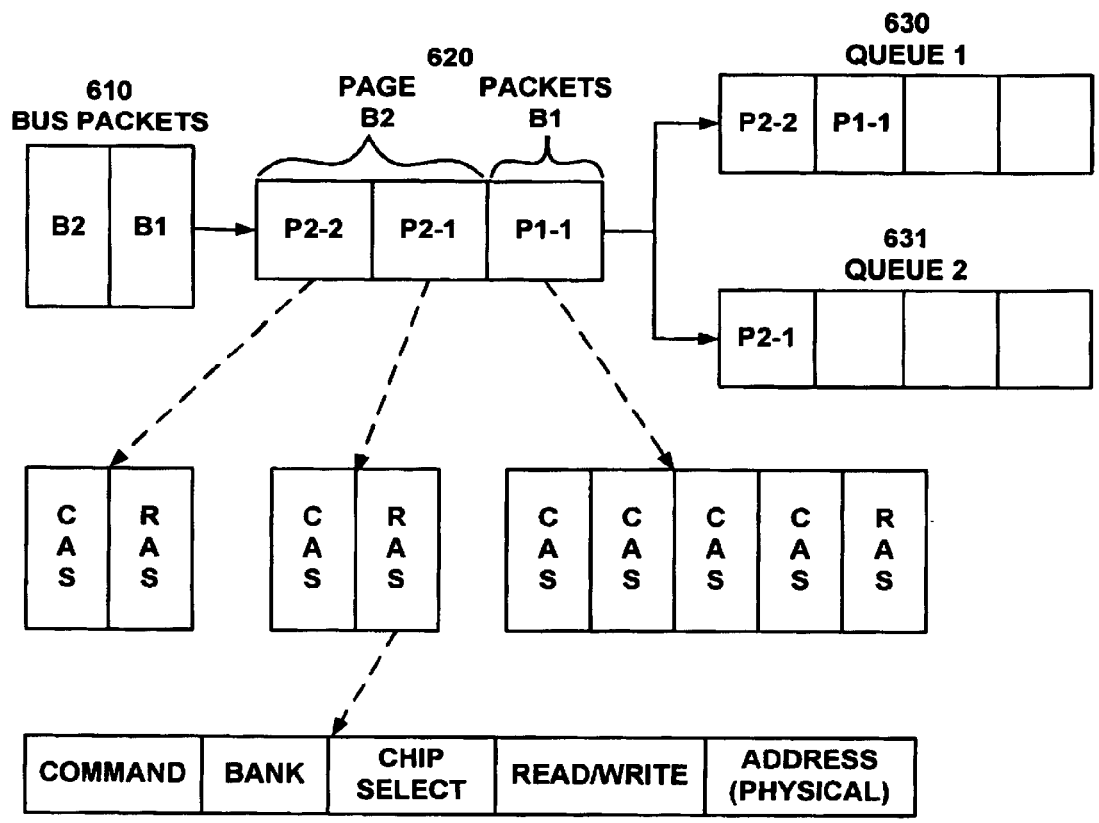
FIG. 6 shows a block diagram of packet handling, in accordance with one embodiment of the present invention.

Referring now to FIG. 6, a block diagram of packet handling, in accordance with one embodiment of the present invention, is shown. As depicted in FIG. 6, a plurality of bus packets 610 are received. When a memory access crosses over a page boundary, the bus packet 610 is broken into multiple page packets 620. The resulting page packets 620 are sequentially loaded round robin into a plurality of command queues 630, 631, relative to the order that the bus packets 610 are received.

In an exemplary implementation, bus packets B1 and B2 are received. B1 is a bus packet that contains 8 words all belonging to the same page, and B2 contains 2 words each of which belong to different banks. Therefore, bus packet B1 is converted to a page packet P1-1. Bus packet B2 is broken at the page boundary thereby forming page packets P2-1 and P2-2. Breaking bus packets that cross a page boundary into a plurality of corresponding page packets ensures that access within a page packet belongs to the same block and all page packets are started with a row access command (RAS).

Page packets P1-1, P2-1, P2-2 are then loaded alternately round robin into Queue 1 and Queue 2. P1-1 is loaded into Queue 1, P2-1 is loaded into Queue 2, P2-2 is loaded into Queue 1, while the next page packet will be loaded into Queue 2, and so on. The memory access order of the bus packets is thus preserved.

Page packet P1-1, for example, comprises a series of access commands. The protocol of an external memory unit requires the issuance of a row access command (RAS) to open the row. Thereafter four column access commands (CAS) is issued to transfer the eight words of data, assuming double data rate operation. Each access command may comprise a header containing the access command, the bank to which the access command applies to, the chip to which the access command applies to, whether the transfer is a read or write operation, and the physical address (e.g., row address or columns address).

Referring now to FIG. 7, an exemplary sequence of write transfers, in accordance with one embodiment of the present invention, is show. As illustrate in FIG. 7, the first page packet (e.g., $RAS_{B0}$, $CAS_{B0}$, $CAS_{B0}$, $CAS_{B0}$, $CAS_{B0}$) is loaded into Queue 1. The second page packet (e.g., $RAS_{B1}$, $CAS_{B1}$) is loaded into Queue 2. The third page packet (e.g., $RAS_{B2}$, $CAS_{B2}$) is loaded into Queue 1. The forth page packet (e.g., $RAS_{B3}$, $CAS_{B3}$) is loaded into Queue 2. The first page packet writes 8 words to Bank 0 (B0). The second, third and fourth packets write 2 words each to Banks 1, 2 and 3 (B1, B2, B3) respectively. The exemplary memory unit is a synchronous dynamic random access memory (SDRAM), having four banks and supporting a burst size of 4.

A row access command ($RAS_{B0}$) and four column access commands ($CAS_{B0}$) are issued to transfer the first page packet to bank 0, as indicated by the row entitled "Queue 1". One row access command ($RAS_{B1}$) and one columns access command ($CAS_{B1}$) are issued to transfer the second page packet to Bank 1, as indicated by the row entitled "Queue 2". One row access command ($RAS_{B2}$) and one column access command ($CAS_{B2}$) are issued to transfer the third page packet to Bank 2. One row access command ($RAS_{B3}$) and one column access command ($CAS_{B3}$) are issued to transfer the fourth page packet to Bank 3.

During the first ten clock cycles, Queue 1 is the current queue and the access commands related to the first page packet are issued therefrom, as indicated by the row entitled "Current". During idle clock cycles the arbitrator may look ahead at the commands in Queue 2, as indicated by the row entitled "Next". At the completion of the first page packet, the status of the queues toggle, whereby Queue 2 holds the current set of access commands and Queue 1 holds the next set of access commands, as indicated at clock cycles 9 and 10. Similarly, upon completion of the second packet, the status of the queues will toggle, as indicated at clock cycles 11 and 12. Upon completion of the third packet, the status of the queues will once again toggle, as indicated at clock cycles 13 and 14. The flow of commands and data to a physical interface module is represented by the rows entitled "command" and "data" respectively.

The protocol of the exemplary SDRAM results in idle clock cycles. A row access command (RAS) for the next page packet may be performed during the execution of the current page packet. A precharge command (PRE) may also be performed during the execution of the current page packet. Therefore, overhead clock cycles for the next page packet are overlapped (or hidden) with commands of the current page packet. The reduction of such overhead cycles provides for improving memory bandwidth efficiency. By overlapping execution of current page packet with access commands of the next page packet, data can be written or read seamlessly into memory. Page packet overlapping increases memory data bus utilization.

In one exemplary implementation, the row access command of the next page packet may be overlapped with execution of the current page packet, during an idle clock cycles. By issuing row activate commands at earlier idle clock cycles, the corresponding column activate commands can be issued earlier. For example, the row activate command for Bank 1 ($RAS_{B1}$) of the second page packet can be executed at clock cycle 6, by exploiting the write burst (e.g., $CAS_{B0}$, $CAS_{B0}$, $CAS_{B0}$, $CAS_{B0}$). The row activate command of the next page packet can also be overlapped during an idle cycle created due to a protocol timing constraint such as write recovery time (e.g., write column activate command to precharge command, 2 clock cycles). For example, the row activate command for Bank 3 ($RAS_{B3}$) of the fourth page packet can be executed at clock cycle 14.

In another exemplary implementation, precharge commands for any bank, which is not being accessed by the current page packet, may be overlapped with execution of the current page packet. By issuing precharge commands at idle clock cycles, the banks are kept ready for subsequent memory access commands. For example, the precharge command for Bank 3 ($PRE_{B3}$) can be executed at clock cycle 8 to exploit the column access command burst of first page packet. A precharge command for Bank 0 ($PRE_{B0}$) can also be executed at clock cycle 15 to exploit a potential idle clock cycle created due to protocol timing constraints such as activate to write (e.g., row activate command to columns activate, 3 clock cycles). Accordingly, the command and/or data bus utilization is substantial increase, as compared to the conventional art method.

Referring now to FIG. 8, another exemplary sequence of write transfers, in accordance with one embodiment of the present invention, is shown. As illustrate in FIG. 8, the first page packet (e.g., $RAS_{B0}$, $CAS_{B0}$) is loaded into Queue 1. The second page packet (e.g., $RAS_{B1}$, $CAS_{B1}$) is loaded into Queue 2. The third page packet (e.g., $RAS_{B0}$, $CAS_{B0}$) is loaded into Queue 1. Each page packet writes 2 words each to Bank 0, 1 and 0 (B0, B1, B0). The exemplary memory unit is a synchronous dynamic random access memory (SDRAM), having four banks and supporting a burst size of 4.

A row access command ($RAS_{B0}$) and a column access commands ($CAS_{B0}$) are issued to transfer the first page packet to bank 0, as indicated by the row entitled "Queue 1". One row access command ($RAS_{B1}$) and one columns access command ($CAS_{B1}$) are issued to transfer the second page packet to Bank 1, as indicated by the row entitled "Queue 2". One row access command ($RAS_{B0}$) and one column access command ($CAS_{B0}$) are issued to transfer the third page packet to Bank 0.

During the first six clock cycles, Queue 1 is the current queue and the access commands related to the first page packet are issued therefrom. During idle clock cycles the arbitrator may look ahead at the commands in Queue 2. At the completion of the first page packet, the status of the queues toggle, whereby Queue 2 holds the current set of access commands and Queue 1 holds the next set of access commands, as indicated at clock cycles 5 and 6.

Precharge commands for any bank, which is not being accessed by the current or next page packet, may be overlapped with execution of the current page packet. By issuing precharge commands at idle clock cycles, the banks are kept ready for subsequent memory access command. For example, the precharge command for Bank 3 ($PRE_{B3}$) can be executed at clock cycle 2 to exploit a potential idle clock cycle created due to protocol timing constraints such as activate to activate. A precharge command for Bank 2 (PRE$_{B2}$) can also be executed at clock cycle 9 to exploit a potential idle clock cycle created due timing constraints such as precharge to activate. Accordingly, the command and/or data bus utilization is substantial increase, as compared to the conventional art method.

Figure 9:
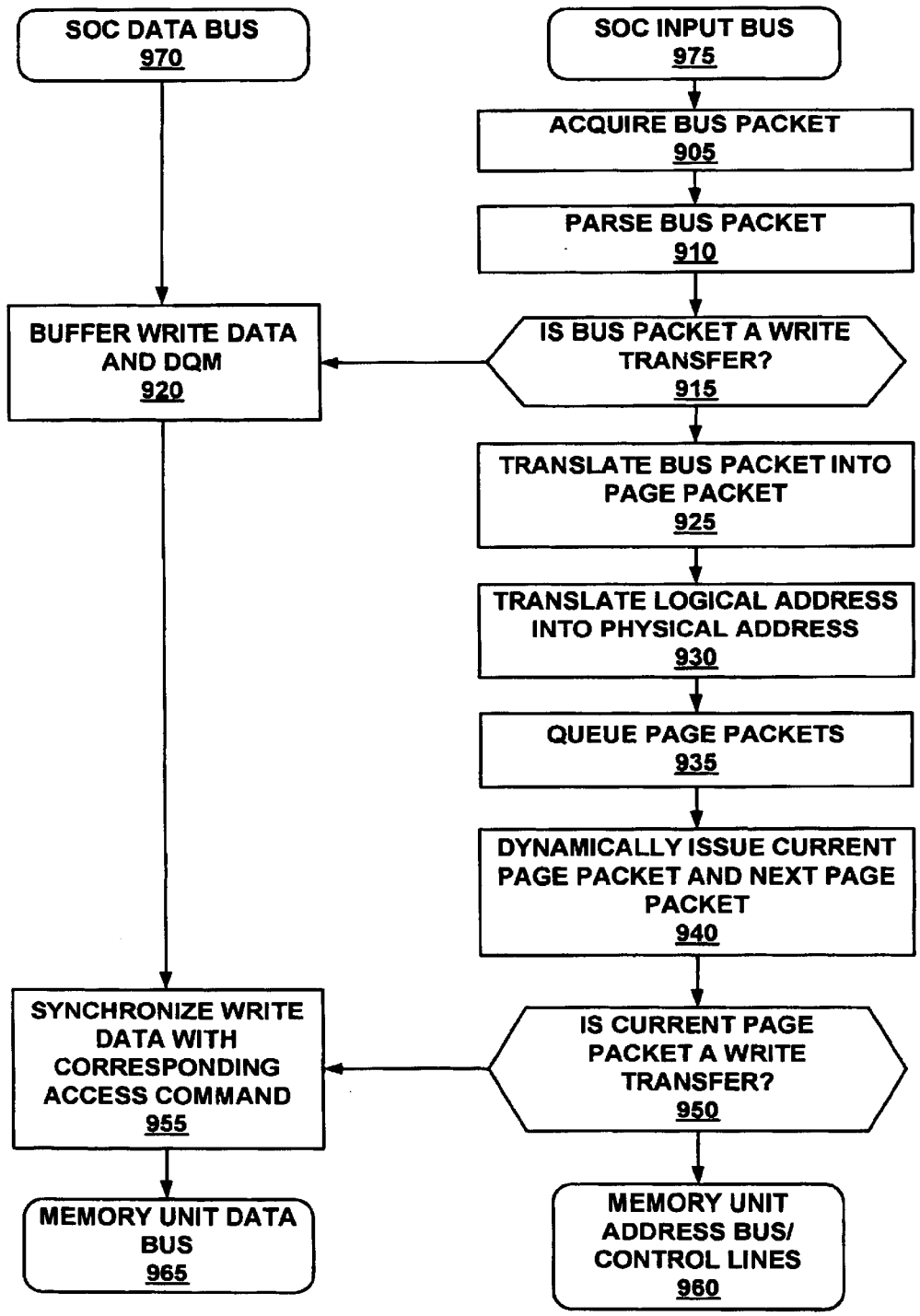
FIG. 9 shows a flow diagram of a method of dynamically allocating memory commands, in accordance with one embodiment of the present invention.

Referring now to FIG. 9, a flow diagram of a method of dynamically allocating memory commands, in accordance with one embodiment of the present invention, is shown. As depicted in FIG. 9, bus packets are acquired, at step 905, from a system on a chip (SOC) input bus 975. The bus packets are parsed, at step 910. If the bus packet is a write transfer, step 915, the data and byte enable signals (DQM) are buffered, step 920.

The method then proceeds to translate the bus packets into one or more page packets, at step 925. Each bus packet is translated into a page packet such that the page packet reads or writes to a single page (e.g., block). Furthermore, each page packet also begins with an activate command (e.g., row access command (RAS)). The logical address of each bus packet is also translated into a physical address (e.g., row, column, bank, chip select, and/or the like) for inclusion in the corresponding page packets, at step 930.

The page packets are loaded round robin into a plurality of first-in-first-out (FIFO) queues, such that the order of the bus packets are maintained, at step 935. Alternately loading the page packets into the plurality of queues, allow the access commands of current and the next page packets to be visible at the same time. The access commands of the present page packet and the next page packet are dynamically issued, at step 940. Therefore, an access command form the next page packet may be issued, during a clock cycle that would be idle if only access commands from the current page packet were issued.

If the issued access command is a write transfer, step 950, the buffered data and DQM are synchronized with the issued access command, step 955. Thereafter, the issued access command, and the data to be written if applicable, are placed on the control line, address bus, and/or data bus of the external memory unit 960, 965. Data being read from the external memory unit, is returned from the memory unit data bus 915 to the SOC data bus 970, in response to an applicable issued access command.

Accordingly, embodiments of the present invention increase memory bandwidth by dynamically finding bank overlap opportunities between access command of a current page packet and access commands of a next page packet. Embodiment of the present invention fill idle clock cycles during issuance of access commands of the current page packet, by issuing an access command of the next page packet and/or by precharging an open bank from a previous access. Embodiments of the present invention may therefore realize an increase in memory bandwidth of approximately 20%. A comparison of efficiencies of a conventional memory controller and a memory controller in accordance with an exemplary embodiment of the present invention is presented in Table 2.

TABLE 2

| Command | Conventional Memory Controller with Bank Overlap | Present Invention with Bank Overlap | Increase in % Efficiency | Present Invention without Bank Overlap | Overall Efficiency of Present Invention |
| --- | --- | --- | --- | --- | --- |
| Read then Read | 73% | 100% | 27% | 87% | 96.75% |
| Write then Read | 67% | 84% | 17% | 83% | 83.75% |
| Write then Write | 67% | 100% | 33% | 83% | 95.75% |
| Read then Write | 89% | 94% | 5% | 87% | 92.25% |

All commands are with back to back packets, read or write, transferring 8 words, utilizing double data rate mode, with a burst size of 4. For MPEG applications, where 60% of the packets are read, an improvement of 27% over the conventional art memory controller is achieved. For a random access pattern, the probability of bank overlap increases to 75% for a 4-bank configuration. Thus, the exemplary embodiment of the present invention will provide additional improvement over the convention art memory controller.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A memory controller comprising:
   a front-end module comprising;
      a page packet generator, for generating one or more page packets from each of a plurality of memory commands, wherein the order of receipt of said memory commands is preserved; and
      an address translation logic communicatively coupled to said page packet generator, for translating a logical address of each of said plurality of memory commands into a physical address of a corresponding one of said page packets;
   a back-end module communicatively coupled to said front-end module, for dynamically issuing a next one of said plurality of page packets while issuing a current one of said plurality of page packets, wherein said current page packet access a first bank and said next page packet access a second bank; and
   a physical interface module communicatively coupled to said back-end module, for causing a plurality of transfers according to said dynamically issued said current one and said next one of said plurality of page packets.

2. The memory controller according to claim 1, wherein said back-end module comprises:
   a plurality of page packet queues, wherein said plurality of page packets are loaded round robin into said plurality of page packet queues;

a plurality of bank monitors, for determining if a set of access commands of a current page packet can be issued to a corresponding first bank and if a set of access commands of a next page packet can be issued to a corresponding second bank; and an arbitrator communicatively coupled to said plurality of page packet queues and said plurality of bank monitors, for issuing said set of access commands of a current page packet, and for issuing one of said set of access commands of said next page packet during an idle clock cycle of said current page packet, if said sets of access commands of said current and said next page packets can be issued.

3. The memory controller according to claim 2, wherein said back-end module further comprises:

a precharge logic communicatively coupled to said plurality of bank monitors and said arbitrator, for determining if an access command for closing a third banks can be issued; and said arbitrator, for issuing said access command for closing said third bank if said access command for closing said third bank can be issued.

4. The memory controller according to claim 2, wherein said arbitrator issues each of said set of access commands according to a protocol.

5. The memory controller according to claim 4, wherein said arbitrator issues each of said set of access commands according to a set of timing constraints.

6. A memory controller comprising:

a page packet generator that generates page packets in response to memory commands; address translation logic, communicatively coupled to said page packet generator, that translates a logical address of each of said memory commands into a physical address of a corresponding page packet;

first and second page packet queues, wherein a plurality of said page packets are loaded round-robin into said first and said second page packet queues, and wherein said first page packet queue contains a current page packet and said second page packet queue contains a next page packet at any given time;

a plurality of bank monitors, communicatively coupled to a corresponding one of a plurality of banks in a memory unit, that determine a state of each of said plurality of banks; and an arbitrator communicatively coupled to said first and said second page packet queues and to said plurality of bank monitors, wherein said current page packet is issued according to a set of timing constraints and a state of a first bank corresponding to the current page packet, and wherein said next page packet is issued, starting at an idle clock cycle of said current page packet, according to a set of timing constraints, and a state of a second bank corresponding to the next page packet.

7. The memory controller according to claim 6, further comprising:

a precharge logic communicatively coupled to said plurality of bank monitors and said arbitrator, for causing said arbitrator to issue a close command for a third bank at an idle clock cycle of said current page packet according to a set of timing constraints and said state of one of said third banks.

8. The memory controller according to claim 6, further comprising a data buffer for buffering data associated with one of said plurality of page packets providing for a write transfer.

9. The memory controller of claim 6, further comprising:

a parser, communicatively coupled to said page packet generator and to said address translation logic, that acquires a plurality of bus packets.

10. The memory controller according to claim 9, further comprising a synchronizing buffer communicatively coupled between said parser, said address translation logic and said page packet generator, for buffering said plurality of bus packets.

11. The memory controller according to claim 6, wherein each page packet comprises:

a set of headers according to a protocol; and a data.

12. The memory controller according to claim 11, wherein each header comprises:

an access command;

a bank identifier;

a transfer type; and a physical address.

13. A method of accessing an external memory unit comprising:

receiving a plurality of bus packets;

generating a plurality of page packets from said plurality of bus packets, wherein each of said plurality of page packets corresponds to one of said plurality of bus packets;

translating a logical address of each of said plurality of bus packets into a physical address of a respective one of said plurality of page packets;

queueing said plurality of page packets, wherein the original order of receipt of said plurality of bus packets is preserved;

determining a state of a plurality of banks; and dynamically arbitrating issuance of a next page packet while issuing a current page packet, as a function of said state of said plurality of banks.

14. The method according to claim 13, further comprising dynamically issuing a precharge command while issuing said current page packet as a function of said state of said plurality of banks.

15. The method according to claim 13, wherein said generating a plurality of page packets from said plurality of bus packets comprises:

converting one of said plurality of bus packets into a corresponding page packet, if said one bus packet does not crosses a page boundary; and converting one of said plurality of bus packets into a corresponding plurality of page packets, if said one bus packet crosses a page boundary.

16. The method according to claim 15, wherein each page packet begins with a column activate command.

17. The method according to claim 16, wherein each page packet accesses a single bank.

18. The method according to claim 13, wherein said dynamically arbitrating issuance of said next page packet while issuing said current page packet comprises issuing a set of access commands of said current page packet to a corresponding first bank, and issuing one of a set of access commands of said next page packet during an idle clock cycle of said current page packet, if said sets of access commands of said current and said next page packets can be issued.

19. The method according to claim 18, wherein each of said set of access commands comprises one or more access commands selected according to a protocol from the group consisting of a row activate, a column activate, a no operation, a precharge and a burst stop.

20. A memory controller comprising:
- a front-end module for generating a plurality of page packets from a plurality of received memory commands, wherein the order of receipt of said memory commands is preserved;
- a back-end module communicatively coupled to said front-end module, comprising;
- a plurality of page packet queues, wherein said plurality of page packets are loaded round robin into said plurality of page packet queues;
- a plurality of bank monitors, for determining if a set of access commands of a current page packet can be issued to a corresponding first bank and if a set of access commands of a next page packet can be issued to a corresponding second bank; and
- an arbitrator communicatively coupled to said plurality of page packet queues and said plurality of bank monitors, for issuing said set of access commands of a current page packet, and for issuing one of said set of access commands of said next page packet during an idle clock cycle of said current page packet, if said sets of access commands of said current and said next page packets can be issued; and
- a physical interface module communicatively coupled to said back-end module, for causing a plurality of transfers according to a dynamically issued said current one and said next one of said plurality of page packets.

21. The memory controller according to claim 20, wherein said front-end module comprises:
- a page packet generator, for generating one or more page packets from each of said plurality of memory commands; and
- an address translation logic communicatively coupled to said page packet generator, for translating a logical address of each of said plurality of memory commands into a physical address of a corresponding one of said page packets.

22. The memory controller according to claim 20, wherein said back-end module further comprises:
- a precharge logic communicatively coupled to said plurality of bank monitors and said arbitrator, for determining if an access command for closing a third banks can be issued; and
- said arbitrator, for issuing said access command for closing said third bank if said access command for closing said third bank can be issued.

23. The memory controller according to claim 20, wherein said arbitrator issues each of said set of access commands according to a protocol.

24. The memory controller according to claim 23, wherein said arbitrator issues each of said set of access commands according to a set of timing constraints.

* * * * *